US009483805B1

(12) United States Patent
Fieldman (10) Patent No.: US 9,483,805 B1
(45) Date of Patent: Nov. 1, 2016

(54) LIMITED TOKENS IN ONLINE EDUCATION (71) Applicant: Study Social, Inc., Gainesville, FL (US)

(72) Inventor: Ethan Fieldman, Gainesville, FL (US)

(73) Assignee: Study Social, Inc., Gainesville, FL (US)

( * ) Notice: Subject to any disclaimer, the term of this patent is extended or adjusted under 35 U.S.C. 154(b) by 0 days.

(21) Appl. No.: 15/064,292

(22) Filed: Mar. 8, 2016

Related U.S. Application Data

(60) Provisional application No. 62/151,858, filed on Apr. 23, 2015.

(51) Int. Cl.
G06Q 30/06 (2012.01)
G06F 21/10 (2013.01)
H04N 21/2543 (2011.01)
G06Q 50/20 (2012.01)
G06Q 40/00 (2012.01)
G06Q 20/12 (2012.01)
H04L 29/06 (2006.01)

(52) U.S. Cl.
CPC ............. *G06Q 50/205* (2013.01); *G06F 21/10* (2013.01); *G06Q 20/1235* (2013.01); *G06Q 30/0635* (2013.01); *G06Q 40/12* (2013.12); *H04L 63/102* (2013.01); *H04N 21/2543* (2013.01)

(58) Field of Classification Search
CPC ............. G06Q 30/0635; G06F 21/10; H04N 21/2543
USPC .......................... 705/26.81, 51, 52, 59; 725/5
See application file for complete search history.

(56) References Cited

U.S. PATENT DOCUMENTS

| 8,661,461 | B1 * | 2/2014 | Maurer | H04N 21/2543 725/1 |
| 9,292,866 | B2 * | 3/2016 | Allaire | |
| 2003/0208763 | A1 * | 11/2003 | McElhatten | G06F 3/0482 725/58 |
| 2006/0253324 | A1 * | 11/2006 | Miller | G06Q 30/02 705/14.14 |
| 2008/0168515 | A1 * | 7/2008 | Benson | G06F 21/10 725/110 |
| 2009/0083048 | A1 * | 3/2009 | Mandelbaum | G06Q 10/10 705/1.1 |

(Continued)

FOREIGN PATENT DOCUMENTS

WO WO-01/29733 A2 * 4/2001

OTHER PUBLICATIONS

Ridley, M., "Lights, Tokens, Action!:" Sun, London, p. 24, Jun. 19, 2001.*

(Continued)

*Primary Examiner* — Nicholas D Rosen
(74) *Attorney, Agent, or Firm* — Beyer Law Group LLP (57) ABSTRACT

A method of limiting tokens for use by a student within an education application displays numerous membership options. For a price, a certain number of tokens are allowed per month. At the end of each month, tokens do not roll over; the account is reset with the monthly allotment of tokens. If the number of tokens in the account reaches zero, access is blocked. A method limits account sharing by using a limited time viewing window for videos and documents. A stated time limit displayed to the student is greater than the length of the video. An actual time limit not displayed to the student is greater than the stated time limit. Requests to restart the video within the actual time limit are granted. A request to restart the video after the actual time limit is denied unless the student again pays the number of tokens equal to the value of the video.

6 Claims, 11 Drawing Sheets

(56) References Cited

U.S. PATENT DOCUMENTS

| | | | | |
|---|---|---|---|---|
| 2009/0083777 A1* | 3/2009 | St. John-Larkin | H04N 7/17318 | 725/2 |
| 2010/0050199 A1* | 2/2010 | Kennedy | H04N 7/17318 | 725/5 |
| 2010/0083322 A1* | 4/2010 | Rouse | H04N 7/17318 | 725/93 |
| 2010/0228613 A1* | 9/2010 | Anderson | G06Q 30/02 | 705/14.13 |
| 2011/0166918 A1* | 7/2011 | Allaire | G06Q 30/0239 | 705/14.7 |
| 2014/0188937 A1* | 7/2014 | Kiefer | G06F 21/10 | 707/781 |
| 2015/0262496 A1* | 9/2015 | Cook | G09B 5/06 | 434/309 |

OTHER PUBLICATIONS

Swett, C., "Play It Again, Zune: Microsoft's Portable Music Device is Much Superior to last year's Model, but It Still Falls Short of Industry Leader iPod," McClatchy—Tribune Business News, Nov. 13, 2007.*

Yuen-C, T., "High Rollers, but in a Virtual World," McClatchy—Tribune Business News, Oct. 28, 2010.*

U.S. Appl. No. 15/064,207 claims, filed Mar. 8, 2016.*

U.S. Appl. No. 15/064,255 claims, filed Mar. 8, 2016.*

* cited by examiner

Pricing / Buy Now

Membership Options ♥ ◎ ◉

Diamond-VIP

$75/mo

200 Tokens/mo

Access to all live Exam Reviews, Chapter Reviews, Study Hours, & priority check in

⚲ 412

Gold — MOST POPULAR $50/mo

100 Tokens/mo

Access to all live Exam Reviews, Chapter Reviews, & Study Hours

◉ 408

Silver

$25/mo

50 Tokens/mo

Access to all live Exam Reviews

⚲ 404

---

Individual Tokens 👟   416

○ 5 Tokens          $5 (one-time fee)
○ 25 Tokens         $20 (one-time fee)

Token Purchasing Options

□ Thank You □

Your membership was successfully purchased.

| Save and print the information below for your own personal records | | 422 |
|---|---|---|
| Next Membership Fee: | $50.00 | |
| Membership is Now: | Gold○ | |
| Your Card will automatically be charged again on: | 05-17-2015 | |
| Confirmation Code: | 09C8AF3A | |

| History Activity ⌐452 | 454 Date | 456 Tokens Before and After | |
|---|---|---|---|
| Session 12 Review Guide (Password - elim) | 04-13-2015 | 83 | 82 |
| Session 13 Review Guide (Password - glycol) | 04-13-2015 | 84 | 83 |
| Session 13 Review Guide (Password - glycol) | 04-13-2015 | 84 | 83 |
| PHY2049 Intro Content | 04-01-2015 | 85 | 84 |
| MAC2312 - Exam 2 Review Part 1 (1-2 HOUR Video, requires 15 tokens) | 03-26-2015 | 100 | 85 |

LIMITED TOKENS IN ONLINE EDUCATION

CROSS-REFERENCE TO RELATED APPLICATIONS

This application claims priority of U.S. provisional patent application No. 62/151,858, filed Apr. 23, 2015, entitled "ACCOUNT SHARING DETECTION AND PREVENTION IN ONLINE EDUCATION," which is hereby incorporated by reference.

This application is related to U.S. patent application Ser. Nos. 15/064,207 and 15/064,255, filed on the same date herewith, entitled "ACCOUNT SHARING PREVENTION IN ONLINE EDUCATION" and "ACCOUNT SHARING DETECTION IN ONLINE EDUCATION," which are hereby incorporated by reference.

FIELD OF THE INVENTION

The present invention relates generally to online education. More specifically, the present invention limits tokens used and limits viewing time in order to discourage fraud in online education.

BACKGROUND OF THE INVENTION

Online education is a very promising approach to education and is primarily based upon the use of computers and mobile devices for learning, in addition to the use of other more traditional resources. Individual user accounts for students are often used to provide access, to track payments, to track progress, etc., but can be ripe for fraud. For example, students may attempt to share another student's account when each student preferably should use his or her own account. In other words, a student shares his or her valid account with another student who has not signed up nor paid for the service. Or, a number of students might attempt to share a fictitious account.

Account sharing is problematic and detrimental to learning, as account sharing creates a disincentive for the education provider to produce high quality material (due to the monetary pressures of server costs, curriculum specialists, programming time, etc.) and makes it unfeasible for the education provider to continue to provide high-quality, high-time investment resources to students. This account sharing can lead to a proliferation, for instance, of subpar or generalized material. The cost of producing high quality, specialized material is high, and account sharing makes it untenable for education providers to continue to provide resources at a high level. This leads to a "race to the bottom," in which education providers offer generalized material or material that does not involve significant monetary or time investment on the part of the education provider. This in turn, affects the student, as the student will no longer receive the high quality product she or he initially anticipated. Furthermore, sharing accounts makes it difficult for the student to benefit from data-driven analytics that suggest the proper material or courses for a student, given the student's usage of the material and the student's performance. The student's learning experience is degraded and does not benefit from the strengths of online education, namely, personalization and quality of content.

In particular, it can be beneficial to discourage account sharing from occurring, and if it does occur, to increase revenue from the students involved. Accordingly, improved techniques and systems are desired.

SUMMARY OF THE INVENTION

To achieve the foregoing, and in accordance with the purpose of the present invention, an online education system is disclosed that discourages account sharing and increases revenue using various techniques.

In a first embodiment, a technique to limit token use presents the user with a number of membership options, each option corresponding to a price and a certain number of tokens per month or other time period. The user account is credited with the number of tokens per month. Tokens are deducted for watching videos, viewing documents, etc. At the end of the month the account is reset to only contain the number of tokens allowed each month.

In a second embodiment, a technique to limit token use registers for a student account in a database a number of tokens allowed per month or other time period. Periodically, at the beginning of each month, the number of tokens in the account is reset to be the number of tokens allowed per month. Tokens are deducted for watching videos, viewing documents, etc. If the number of tokens in the account ever reach zero, then access to educational content is blocked until the student purchases more tokens.

In a third embodiment, account sharing is limited by using a limited time viewing window. Tokens are deducted from a student account for watching a video or viewing a document. Should the student pause the video, and then request a restart at a later time, the request is granted if the elapsed time is under the stated time limit that had been displayed to the student. If the elapsed time is less than an actual time limit (which has not been displayed to the student) then the request is granted. The request is denied if the elapsed time is greater than the actual time limit. There is a distinction between the stated time limit and the actual time limit so that it easier for the provider to discourage fraud.

In a fourth embodiment, account sharing is limited by requiring more tokens. A student uses a certain number of tokens to begin watching a video or viewing a document. Once a request is received from a student account to restart a video or document that had been paused earlier, the elapsed time is compared to an actual time limit. If the elapsed time is greater, then the request is denied. The video or document is only restarted (or allowed to be played again) if the student again allows the required number of tokens to deducted from his or her account.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Although embodiments of the invention may be used in a variety of contexts, in one specific context online education is promoted and managed by an education company via a Web site or a mobile application accessible from any computer or mobile device. A student seeking educational assistance with K-12 school or college coursework or with standardized tests (e.g., GRE, LSAT, MCAT, etc.), using resources such as videos, electronic documents, printed documents, live review sessions, one-on-one consultations with tutors, etc.) uses the Web site or mobile application to sign up or log in to a student account. Access to the relevant content is then provided via an education application hosted on a server computer.

Block Diagrams

Figure 1:
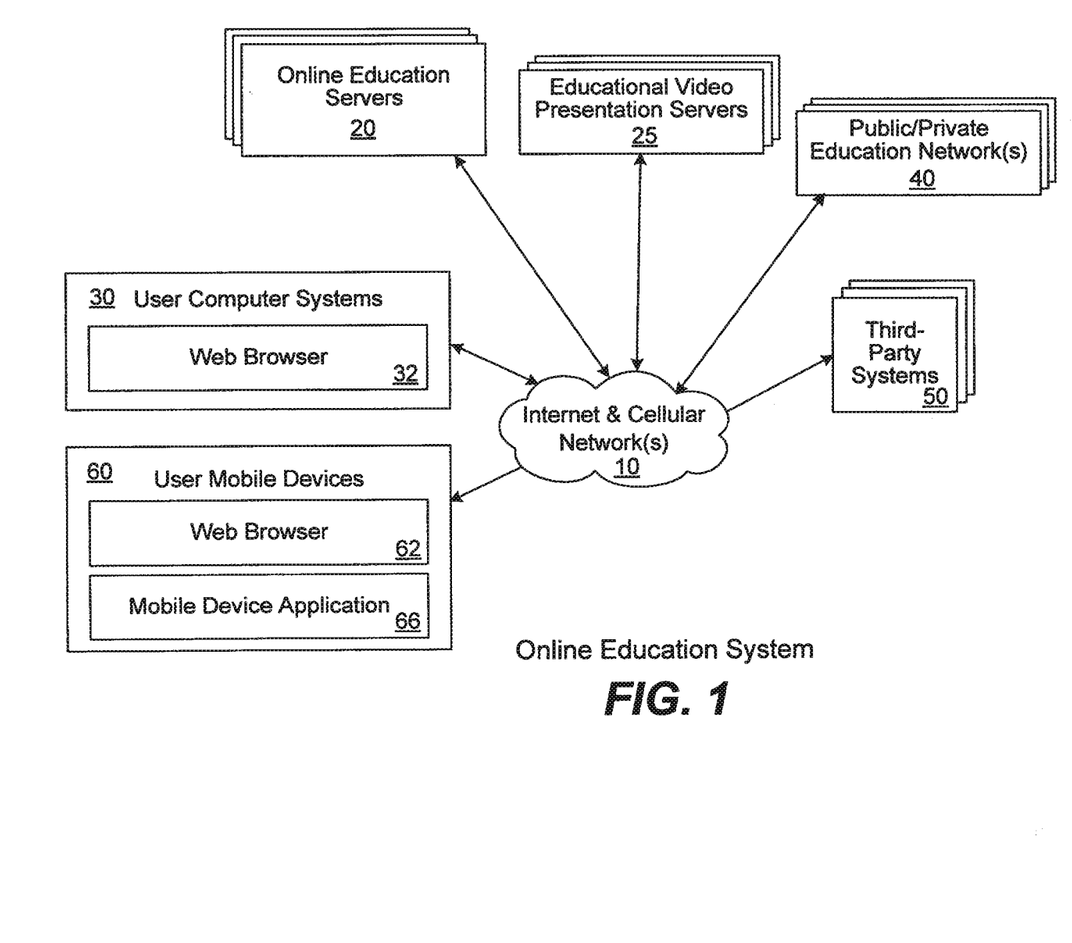
FIG. 1 is a simplified block diagram of a specific embodiment of an online education system.

FIG. 1 is a simplified block diagram of a specific embodiment of an online education system 1, which may be implemented via a computerized data network to provide the service of the education company. As described in greater detail herein, different embodiments of system 1 may be configured to provide various different types of functionalities generally relating to online education. As shown, system 1 may include one or more of the following types of computers, systems, networks, Web sites, databases, mobile devices, etc.

Online education servers 20 perform and implement various types of functions, operations, actions, and other features such as those described herein. Educational video presentation computer servers 25 include videos of educational courses, videos of tutors presenting review materials, etc., all used by students who have access to system 1. Public/private education networks 40, include, for example, student information systems, student data management systems, course management systems, etc., used by schools, colleges, and universities.

User computer systems 30 include any suitable desktop, laptop, tablet computers, etc., operable to provide the various types of online education described herein. User mobile devices 60 include any suitable mobile telephone, personal digital assistant, etc., operable to provide the various types of online education described herein. Internet and cellular networks 10 include suitable wired or wireless networks used for communication between the entities of system 1. Third-party systems 50 include computer servers, Web sites, software, etc. of social media company sites such as Facebook, Twitter, Instagram, LinkedIn, etc.

Figure 2:
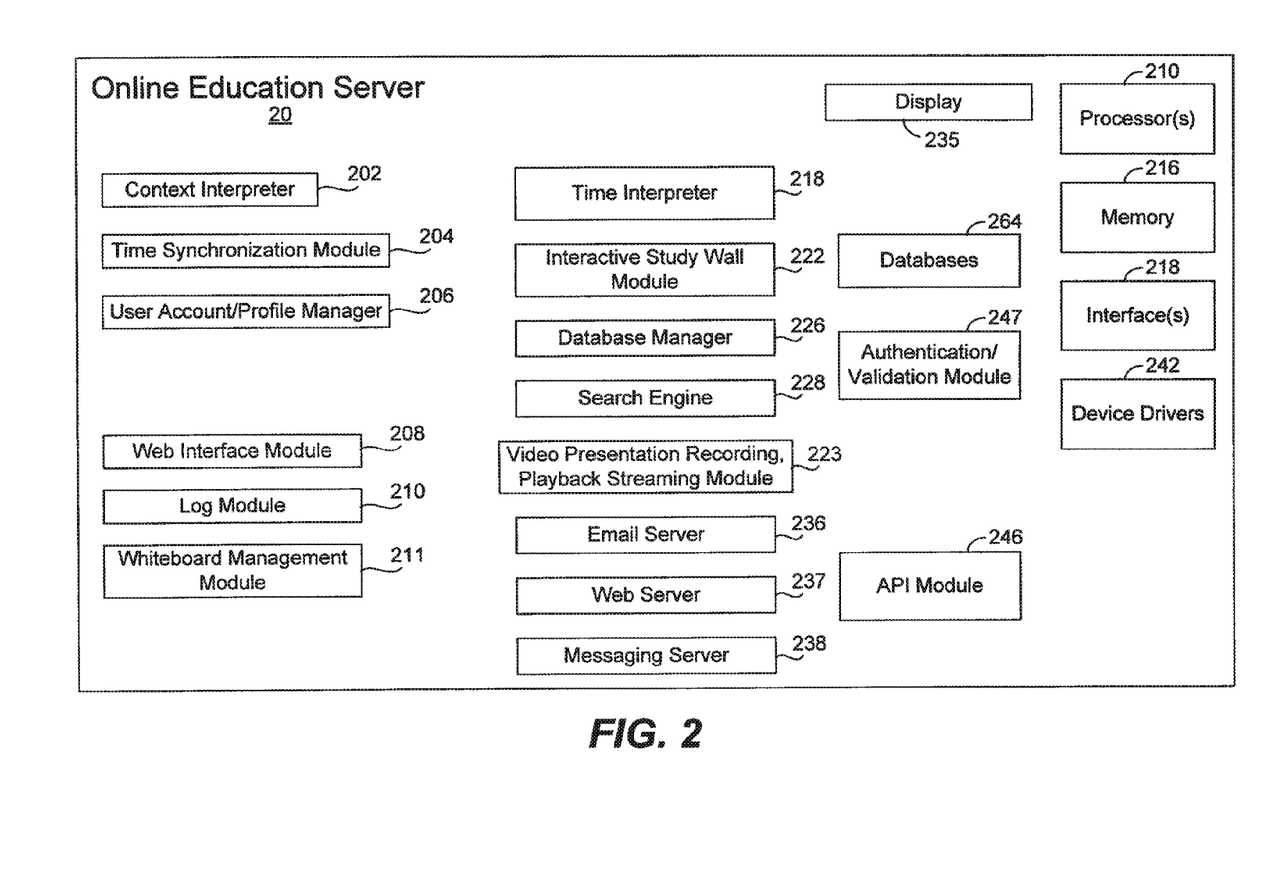
FIG. 2 is a block diagram of software modules and hardware components of an online education computer server in accordance with a specific embodiment.

FIG. 2 is a block diagram of software modules and hardware components of an online education computer server 20 in accordance with a specific embodiment. These modules and components may be implemented upon a single computer or upon multiple computers in communication with one another.

Context interpreter 202 is operable to analyze contextual criteria relating to a detected set of events and automatically determine or identify one or more contextually appropriate responses based on the contextual interpretation of the detected events. Contextual criteria include: location-based criteria; time-based criteria; identity of a user; user profile information; transaction history information; recent user activities; and proximate business-related criteria. Time synchronization module 204 is operable to manage universal time synchronization (e.g., via NTP or GPS). Search engine 228 is operable to search for transactions, logs, items, accounts, or options in the online education system databases. Time interpreter 218 is operable to modify or change identifier activation and expiration times based on various criteria such as time, location, transaction status, etc.

Authentication/validation module 247 includes user identifiers, passwords, software/hardware identifiers, SSL certificates, etc., which are operable to perform various types of authentication and validation tasks such as: verifying/authenticating devices, verifying/authenticating users, verifying passwords, passcodes, SSL certificates, biometric identification information and/or other types of security-related information, and verifying/validating activation or expiration times, etc.

Interactive study wall module 222 is operable to implement various types of wall functions such as allowing a user to post text and images to a wall, or to read postings on a wall. White board management module 211 is operable to perform various types of electronic whiteboard functions. Video presentation recording, playback, streaming module 223 is operable to facilitate, enable, initiate, and perform one or more of the operations relating to the video presentation techniques described herein. Database manager 226 is operable to handle various tasks relating to database updating, database management, database access, etc.

Log module 209 is operable to generate and manage transactions history logs, system errors, connections from APIs, etc. Web interface module 208 is operable to facilitate and manage communications and transactions with other Web portals. API module 246 is operable to facilitate and manage communications and transactions with other APIs of other systems or networks.

Processor 210 may include one or more commonly known CPUs, which are deployed in many of today's computers and consumer electronic devices. Memory 216 may include volatile memory (e.g., RAM), non-volatile memory (e.g., disk memory, FLASH memory, EPROMs, etc.), unalterable memory, and other types of memory. Interface 218 includes wired or wireless interfaces. Device drivers 242 includes functionality similar to one or more computer system driver devices generally known to one having ordinary skill in the art. One or more displays 235 may be implemented using, for example, LCD display technology, or other types of conventional display technology.

E-mail Server 236 provides various functions and operations relating to e-mail activities and communications. Web server 237 provides various functions and operations relating to Web server activities and communications. Messaging server 238 provides various functions and operations relating to text messaging or other social network messaging activities and communications.

Figure 3:
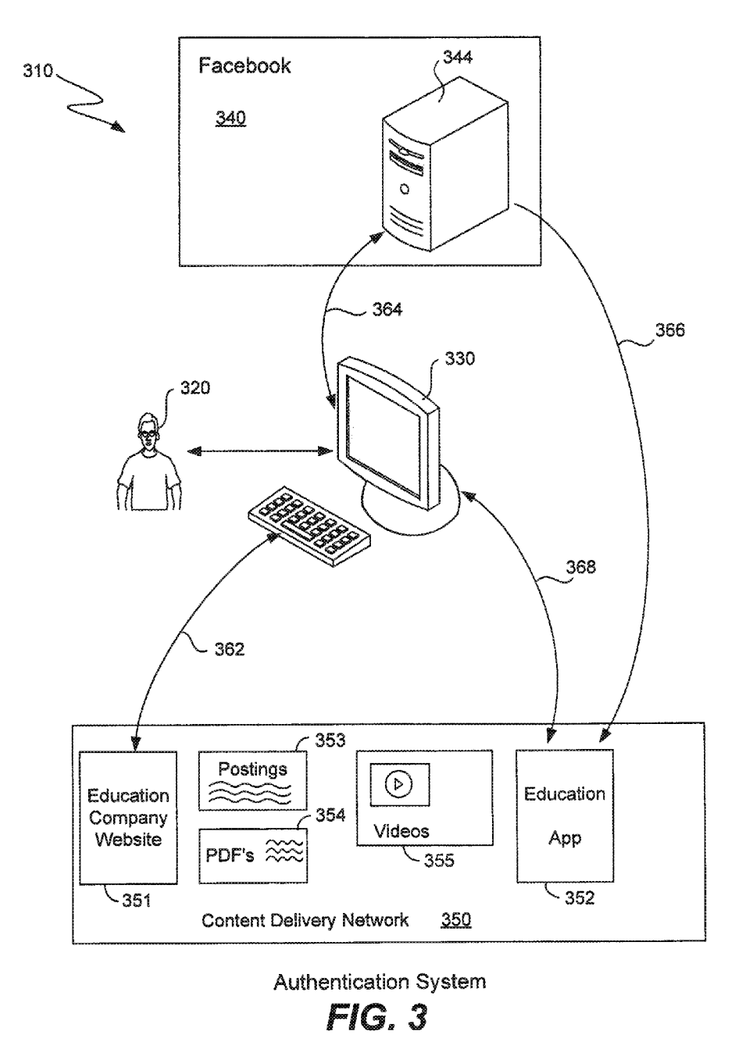
FIG. 3 is a block diagram of an authentication system according to one embodiment.

FIG. 3 is a block diagram of an authentication system according to one embodiment. Included is a user 320 interacting with a computer 330, such as any of devices 30 or 60 mentioned above. Also included is a variety of information hosted upon a content delivery network (CDN) 350. The CDN may be any of a variety of networks such as Akamai, Limelight, Amazon Web Services, etc., and the information need not be hosted upon a single one of these networks, but may be spread across different networks. Included is a Web site of the education company 351, an education application 352 (mentioned above), user postings 353 (e.g., textual comments, photographs, etc. commonly known as a "Wall"), PDF files 354 or any other type of electronic documents and files, and videos 355 such as videos from tutors or professors, videos of live classes, or other instructional videos. Education application 252 may include any or all of the modules and components of FIG. 2.

Facebook 340 is one example of any of a variety of third-party social media companies that may provide authentication services for the education company in order to authenticate any of its users. Computer server 344 is one or many computers under control of the third-party social media company that provides the authentication services. Of course, server 350 may be hosted on yet another content delivery network, yet still be under control of the third-party social media company.

Limited Number of Tokens for Use Per Month

In tandem with the social media account requirement as described above, the education company charges for online learning content via the education application 352 through a token system. The student purchases a monthly membership that comes with a certain number of tokens, and each item of learning content or service offered (e.g., view a video, download a PDF file, attend a live session, pick up a paper study packet, post questions on the content wall, contact a live expert via chat, e-mail, telephone, etc.) requires one or more tokens to be used. Such a token system helps prevent students from sharing accounts with others since each student has a limited amount of tokens that can be used each month. Tokens not used in a given month do not roll over to the next month and are not transferable. Tokens are tied to a particular student account and may only be used within that account.

There are different levels of membership offered. The following describes one embodiment, but there may be more or fewer levels of membership. There are three different levels of membership currently offered. Each membership level costs a different amount and provides a different number of tokens per month (or other time period), i.e., tokens recharge each month according to level. The Silver membership level, or basic tier, provides 50 tokens per month but may only offer access to certain types of content or service (e.g., only certain types of video or certain times of support). The Gold membership level, the second tier, provides 100 tokens per month and provides access to all content. The Diamond membership level, the highest tier, provides 200 tokens per month and also provides access to all content. The model used in the token system is "use them or lose them," that is, tokens unused in a given month do not carry over to the next month. For example, if a student with a Gold membership has 25 tokens left on the final day of the month, on the first day the next month the account will be replenished and will again have 100 tokens on the first day. In another embodiment, tokens do roll over to another month or have an expiration date after a set amount of time (e.g., one semester, one year, etc.).

Note that this token membership system may be tied to and used in tandem with the social media account requirement. Students do not create accounts through the education company, but are instead required to use a social media account, e.g., Facebook, in order to login. Because students do not want to share their social media credentials and are prevented from using fake social media accounts as described above, students will not share their accounts' token allotments with others; thus students are unable to share or sell tokens that they do not use.

Tokens may be used online within a student's account to view any video offered via the education application, to view any file or documents available online, to download files or documents, to register for a live review session that the student will attend at a future time, to register to pick up a paper study packet in the future, to purchase time in order to communicate with a study expert online or by telephone, or to post questions and receive answers online on a message board, blog, message wall, etc. When a student checks in to a session at a physical building location, the staff checking the student in deducts the appropriate number of tokens in the system for attending the session or picking up study packets. The system of deduction may be automatic or manual.

The number of tokens required to access each item of content depends upon a variety of factors including: the length of the video or document; the demand for a particular video or document; the class to which the video document pertains; the expertise, credentials or experience of the instructor in the video; the length of the study packet; the length of the review session; the time spent with a study expert online; etc. Students are told that each action will require a minimum of one token. If more than one token is required for the action the student will receive a popup message informing them of the number of tokens required. The student must then click a checkbox acknowledging that the action will require additional tokens and that they agree and would like to proceed. The student also has the option of canceling the request if they do not wish to use the number of tokens required.

Because tokens are limited in number per month, because each student must use his or her own tokens within his or her own account, and because tokens do not roll over to the next month, students are provided an incentive to choose the plan that best fits his or her needs but at the same time is prevented from sharing an account. Students are able to see the number of tokens remaining on the home page of the education application as well as in their "My Account" page. Within the "My Account" page, the student can view a detailed transaction history of how their tokens have been used. This report can be viewed within the application or exported to be saved by the student if desired. This report of token usage is also accessible by employees of the education company to assist in customer service.

Figure 4:
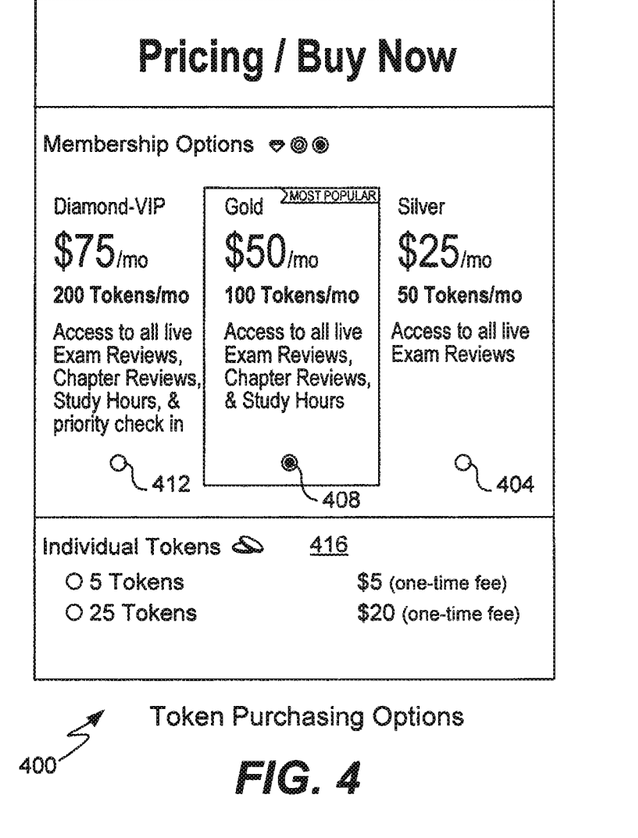
FIG. 4 illustrates a window presented to a user for purchasing tokens.

FIG. 4 illustrates a window 400 presented to a user for purchasing tokens. As shown, there are different membership options, and in this example there are three options. In a first option 404, a student may purchase 50 tokens per month for $25; in a second option 408, a student may purchase 100 tokens per month for $50; and, in a third option 412, a student may purchase 200 tokens per month for $75. Of course, other prices, tokens and benefits are possible with these or other options. A student may also purchase individual tokens as shown in section 416.

Figure 5:
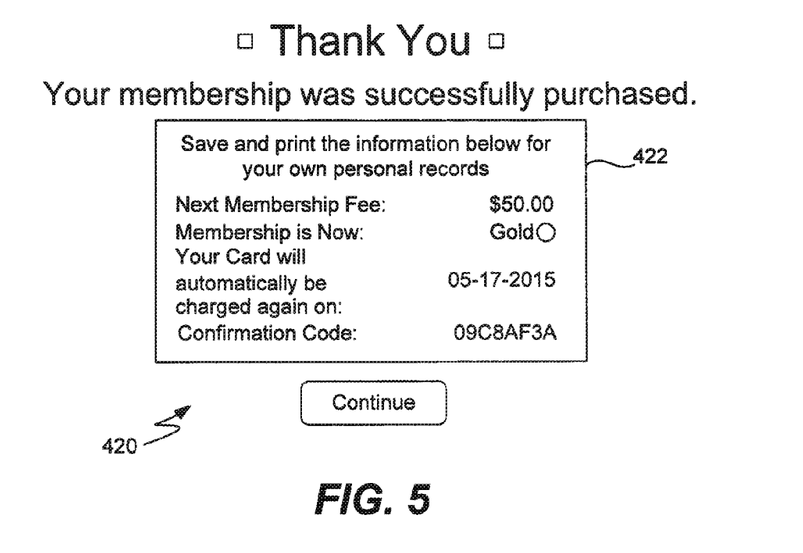
FIG. 5 illustrates a window indicating a successful transaction.

FIG. 5 illustrates a window 420 indicating a successful transaction. After a student has purchased an option window 420 may appear, detailing in section 422 the fee paid, the membership level, the next date on which the fee will again be charged and the tokens will recharge, and the confirmation code for the transaction.

Figure 6:
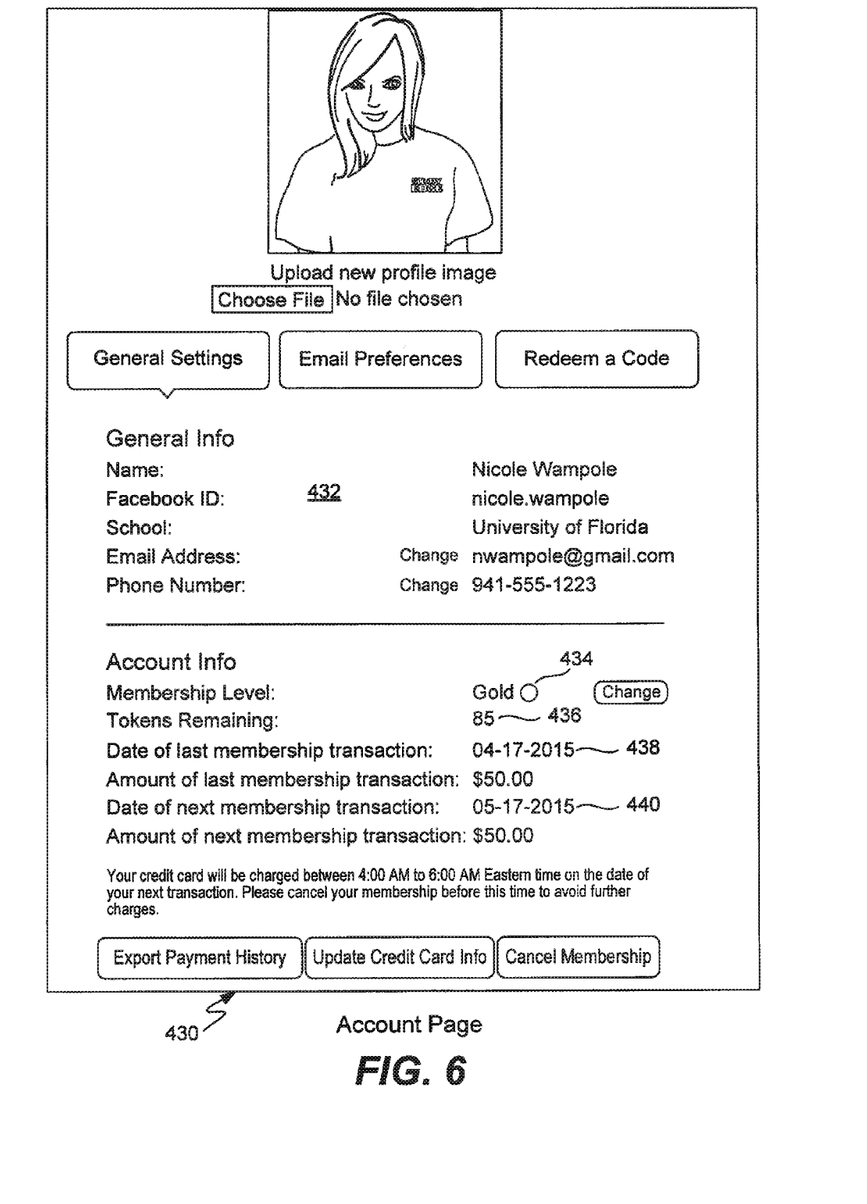
FIG. 6 illustrates an account page for a particular student.

FIG. 6 illustrates an account page 430 for a particular student. Shown is general information in section 432 including name, a unique identifier for the student, school attended, e-mail address and telephone number. Detailed information includes membership level 434, tokens remaining 436 during the current month (or other membership time period), date 438 when the last transaction occurred, and a date 440 when the next fee will be deducted and the tokens will again recharge.

Figure 7:
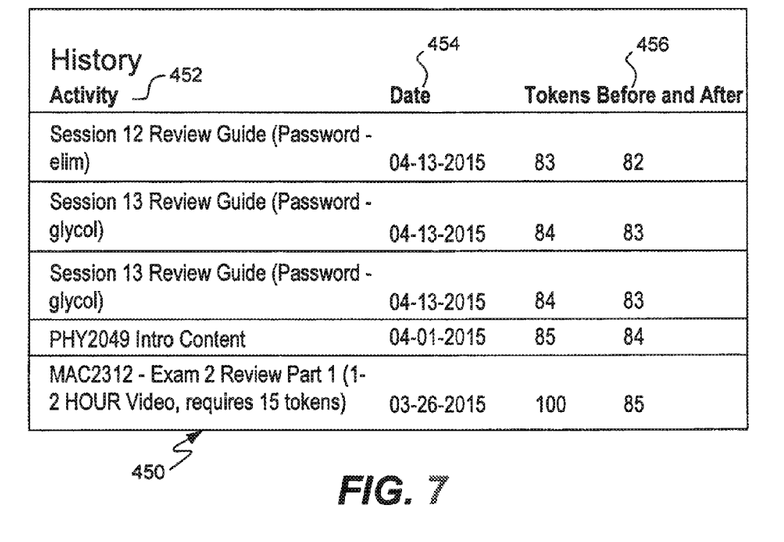
FIG. 7 illustrates a window showing the history of a particular student account.

FIG. 7 illustrates a window 450 showing the history of a particular student account. Shown in column 452 is the specific activity (i.e., downloading a review guide, watching a video, etc.), column 454 shows the date and columns 456 show the tokens in the account before and after the activity. For example, the video in the final row of history requires 15 tokens and column 456 reflects that transaction.

Figure 8:
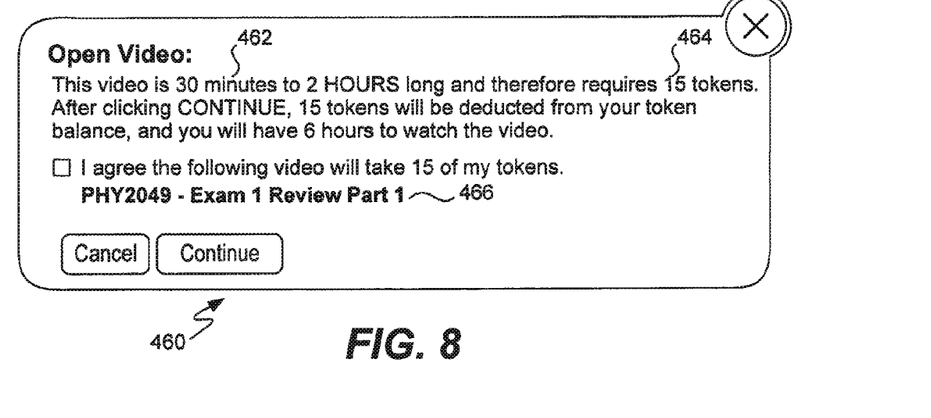
FIG. 8 illustrates a window showing a token agreement.

FIG. 8 illustrates a window 460 showing a token agreement. When a student desires to use, watch or download educational content requiring more than one token, the window describes the length 462 of the video, the number of tokens required 464, and the name of the course and video name 466. Emphasizing the number of tokens required in this manner means that it is less likely that a student can argue that he or she inadvertently selected an expensive video to watch.

Figure 9:
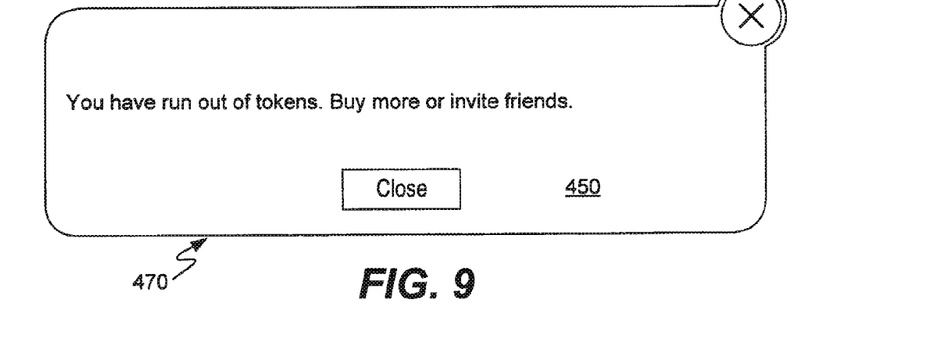
FIG. 9 illustrates a window that appears when a student has run out of tokens in a particular month.

FIG. 9 illustrates a window 470 that appears when a student has run out of tokens in a particular month. The student would need to purchase more tokens or complete another action to acquire tokens (such as inviting friends to the application) to continue watching videos, etc.

Flow Diagram

Figure 10:
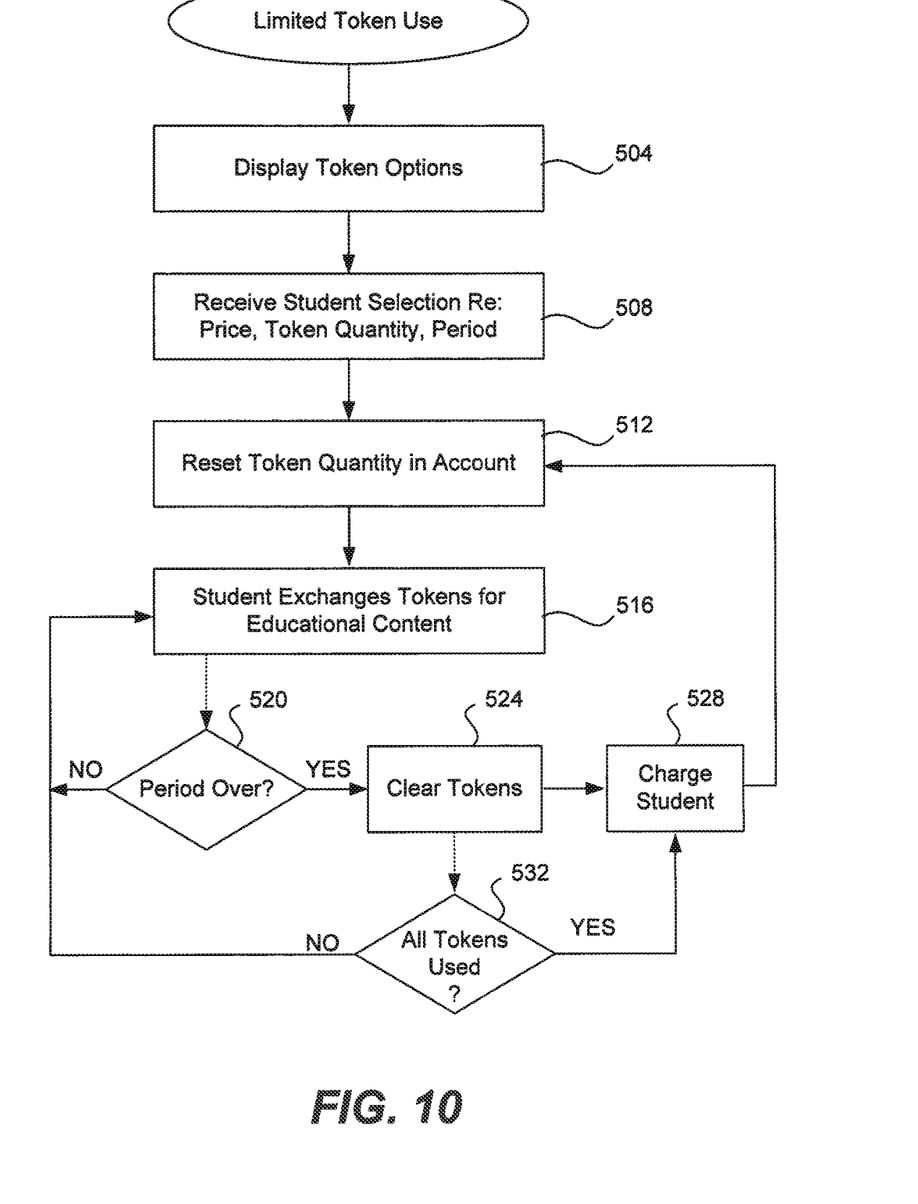
FIG. 10 is a flow diagram describing one embodiment by which tokens are purchased, used and recharged him in connection with an education application.

FIG. 10 is a flow diagram describing one embodiment by which tokens are purchased, used and recharged in connection with an education application. As mentioned above, even though a student may purchase a certain number of tokens per month, these limited tokens do not carry over to the next month; at the beginning of each month any remaining tokens are deleted from the student's account and the account is recharged with the monthly tokens that have been purchased.

In step 504 student 320 uses a computer 330 in order to interact with the education application 352; during the course of this interaction the various membership options are displayed to the student, such as shown in FIG. 4. The student may have logged in to the education application already, or, the student may login after making a selection. In step 508 the student selects one of the membership options and via one of these options selects a particular price to pay per month, a quantity of tokens that will be received each month, and a time period over which the tokens may be used, such as over the course of one month. Of course, other time periods may be presented in the membership options such as a quantity of tokens per week, a quantity of tokens valid over three months, etc.

Next, in step 512 the student's account is reset (or initiated) to contain only the quantity of tokens purchased over the time period (e.g., during one month). Accordingly, in step 516 the student may begin using these tokens to purchase educational content, such as watching videos 355, reading or making postings 353, downloading documents 354, etc. these tokens may be used during the one-month period, for example. Periodically, the education application performs a check 520 as to whether the time period has ended. If one month is up then in step 524 the student's account is cleared of all tokens (i.e., the token quantity is set to zero), the student's credit card, debit card, checking account or other is charged for the next month, and the token quantity is reset in step 512. If the period has not ended then the student may continue to exchange tokens in step 516.

Another check 532 is also performed periodically of the student account. If all of the tokens have been used at any point during the month then the student may be charged again in step 528 for another month and the next month will begin at that time. Alternatively, the student may be prompted to purchase individual tokens during the remainder of that month. In any case, the educational content is not available to the students if all of his or her tokens have been used.

Limited Time Viewing Window

In another technique to deter sharing of accounts or resources, every video or online document has a limited time in which the video or document can be viewed. For example, a four-hour video has an eight-hour viewing window; thus, once a student opens a video, he or she has eight hours in which to finish watching it. If the student tries to watch the same video more than eight hours later, the education application takes away again the number of tokens required to watch the video. If this is a video that requires more than one token to view, the student will again receive the previously mentioned popup informing them of the token requirement. Similarly, a PDF file may be viewed only within the time window. If the student attempts to open the file more than eight hours later either the file will not open, or the student must use tokens to open the file.

The application may tell the student that their viewing window is shorter than it is in actuality; for instance, should the actual time limit be eight hours in which to consume a given product, the student is told that he or she has a six-hour window (the stated time limit) instead of eight, so that if the student asks for more minutes in which to watch a video or read a document due to unexpected changes to his or her schedule, the company may agree to more time, even though the company does not need to do anything in actuality. This maintains the efficacy of the limited time viewing window technique without having to deal with excessive customer service issues. The provider is also able to prevent two types of fraud by users who want to claim they began watching only "six hours ago" but now are unable to access the video. Consider first if it has been only six hours. Because the internal number (e.g., "eight hours") is more than the stated viewing window ("six hours"), the provider knows that user is trying to fraudulently obtain more viewing opportunities (because if only six hours have passed as the user claims, the user should still be able to access video). Or, if the user rightly claims that they are unable to access the video but "only six hours have passed," this means that the user has actually been watching for more than eight hours and again is trying to obtain more viewing opportunities.

Having the viewing window in place also makes it more difficult for students attempting to share an account to watch the same video without being charged additional tokens. With a longer viewing window (or no viewing window at all), it would be more probable for the video to be watched multiple times by different students within the given viewing window, without additional tokens being deducted from the student's account.

Use of an extended time viewing window also allows for the avoidance of confusion on the part of the student on the amount of time they have to complete the video. For example, a student may believe that as long as they restart the video within the stated time limit that they should be allowed to watch it, when in reality, they must complete the video within the actual time limit Due to this extension, any misconceptions will not pose a problem. For example, if a student were to open a two-hour video having a stated three-hour viewing window (and an actual time limit four hours), watch for fifteen minutes, then pause the video, they could restart the video two hours later and still finish the video within the actual time window.

Note that this viewing window technique is different from subscription models like Netflix (in which viewers can watch a given show any time after the show is started, as long as the monthly membership is maintained). This technique is also distinct from lending models such as the one employed by the Apple iTunes store, in which a viewer may rent a movie. The viewer has a given number of days in which to start watching the video (e.g., 30 days) and once movie is started, a given number of hours (e.g., 24 hours) to play the video. In contrast, the education company's viewing window is within the context of a membership model (one has to be a member to even play a video) and there are two different time restrictions—the stated limit and the actual one.

Further, note that even though iTunes may give a user 24 hours to watch a video as many times as he or she may want, the present invention is different. Via the education application, one may watch a video as many times as one wishes, but, one will be charged each time the video is watched outside of the actual viewing window. The viewing window may be 150% or 200% of the video length, for example. Preferably, the viewing window is not 100% of the length of video since the student may wish to pause the video, as the video contains educational content. In another example, for a two-hour review session, the student may receive a three-hour or four-hour viewing window (the actual time limit) since it is desirable that the student only watch it once, but there is extra time as a student may need to pause and think, or rewind the video and watch one part of it again. There is an actual time limit, however, because if the student desires to watch the video again outside of the time limit, it is desirable to charge the student again in the same calendar day the number of tokens that the video requires. Note that iTunes, for example, may provide 24 hours in which to watch a certain one-hour video as many times as one wants for a single fee, whereas the present invention will charge the user each time the video is watched outside of the actual viewing window. Accordingly, use of the above viewing windows and extended time windows not only deters fraud but also maximizes revenue for the education company.

As mentioned above, FIG. 8 shows a screen shot 460 of a message to the student describing a particular video. Note that the video may be as long as two hours, yet it is stated that the student has six hours in which to watch the video. This stated time limit may be the actual time limit, although in one embodiment as mentioned above the actual time limit may be as long as eight hours.

Flow Diagram

Figure 11:
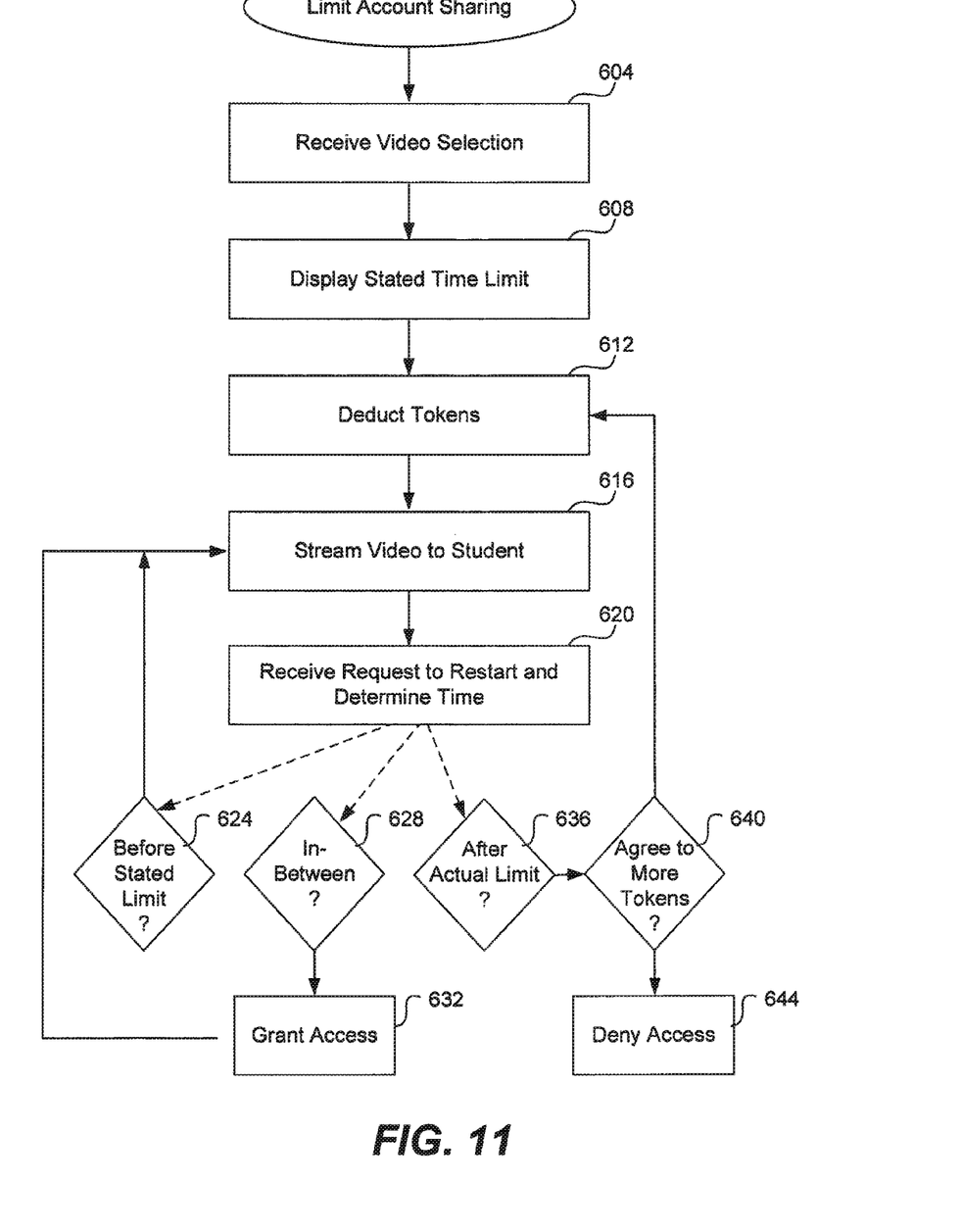
FIG. 11 is a flow diagram describing use of a limited time viewing window for watching a video.

FIG. 11 is a flow diagram describing use of a limited time viewing window for watching a video. Previously, a student has logged into his or her account and has available a certain number of tokens by which to pay for any of the educational content such as videos 355, documents 354, or even the ability to post questions onto a class wall 353 and receive answers. At some point in time, in step 604 a student 320 will use their computer system 30 or mobile device 60 (such as computer 330) to make a particular selection of a video or PDF document via content delivery network 350. Next, the education application 352 may display to the student in step 608 a window such as shown in FIG. 8 in which the length of the video is disclosed along with a stated time limit in which the video must be watched. The student may also be requested to confirm that watching the selected video (or document) will take a certain number of tokens. The time limit stated in FIG. 8 may be the actual time limit after which the video made no longer be watched, or may be less than an actual time limit as described above. Assuming that the student wishes to continue, in step 612 the number of tokens for a particular video or document is deducted from the student account and in step 616 the education application begins streaming the selected video from the content delivery network to the user's computing device.

Preferably, any suitable streaming technique is used to deliver a video or document to the student's computing device. In this manner, the student is not provided with possession of the complete video or document (as if he or she had been able to download the video or document) and is not able to view a video or document as often as he or she likes for only one price. Because the video is being streamed, the education application may terminate the streaming if it is attempted after the actual time limit.

At some point in time, the student may pause or stop the video (or may even log out of his or her account and log in later at a later time on a different computing device) and then request that the video be restarted. This request may not be an explicit request, but may be as simple as clicking the "play" button on a video a short time after the student has paused the video. Once this request has been received by the education application, the application determines if the restart request is within the stated time limit or the actual time limit. For example, as shown in FIG. 8, the video may be two hours long and has a stated time limit of six hours, but the actual time limit may be eight hours. Based upon this determination, control may move to step 624, 628 or 636.

If the request is before the end of the stated time limit then in step 624 control moves immediately to step 616 and the student is allowed to continue watching the video or viewing a document. As far as the student is concerned, this decision is transparent and the student is unaware that any determination has been made. If the request is after the end of the stated time limit, but before the end of the actual time limit, then in step 628 the education application may grant access in step 632 so that the student may continue watching the video. This granting of access may be transparent in that the education application may immediately begin playing the video once the student has clicked upon the "play" button or the application may display a screen stating that "You are over the time limit, but you may continue watching as an exception for you." Alternatively, the application may indicate to the student that the video may not be watched because the time is after the stated time limit and may require the student to make a special request to watch the video which would most likely always be granted. In any case, the student may continue streaming the video to his or her computing device.

On the other hand, if the request is after the end of the actual time limit then in step 636 streaming of the video or document is ceased and control moves to step 640. In this step the student is informed that a time limit has expired and is requested to pay more tokens in order to view the video document again (i.e., 15 more tokens are required). If the student agrees then the stated tokens are deducted in step 612 and the video document may again be streamed to the student's device. If the student does not agree, then in step 644 the education application denies further access to the video or document.

Computer System Embodiment

Figure 12:
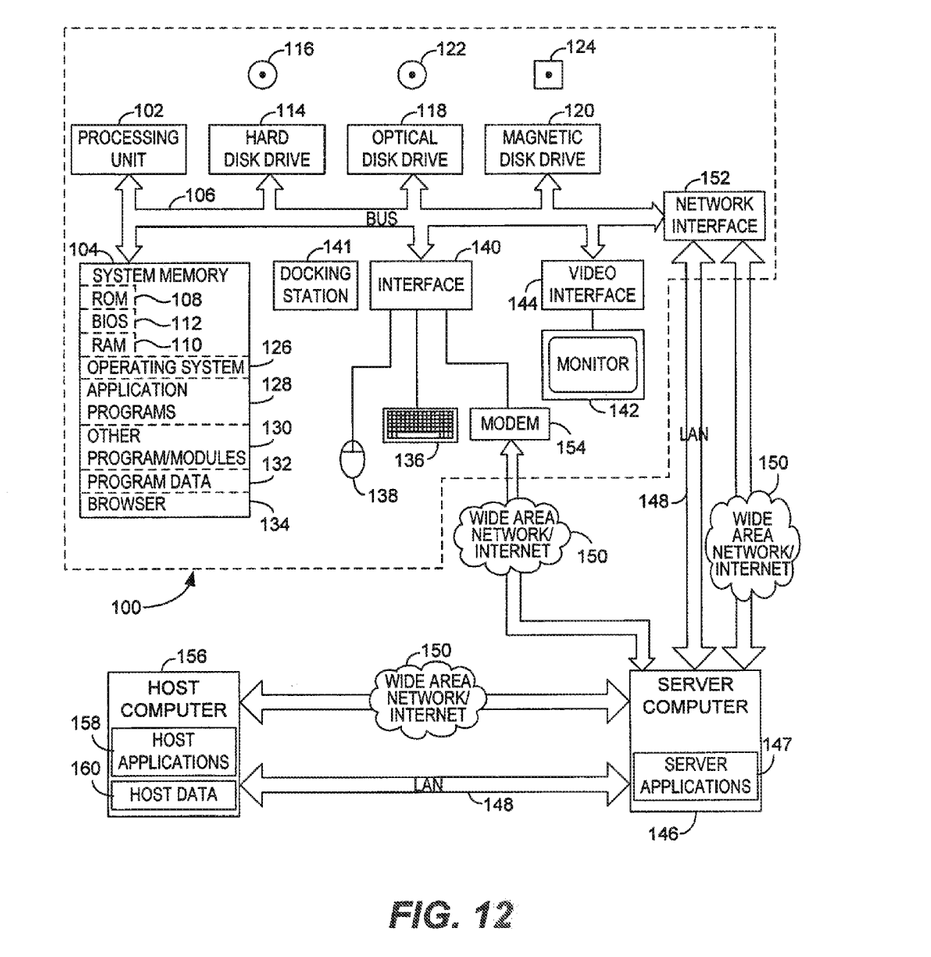
FIG. 12 illustrates a computer system suitable for implementing embodiments of the present invention.

FIG. 12 in cooperation with the above provides a general description of a computing environment that may be used to implement various aspects of the present invention. For purposes of brevity and clarity, embodiments of the invention may be described in the general context of computer-executable instructions, such as program application modules, objects, applications, models, or macros being executed by a computer, which may include but is not limited to personal computer systems, hand-held devices, multiprocessor systems, microprocessor-based or programmable consumer electronics, network PCs, mini computers, mainframe computers, and other equivalent computing and processing sub-systems and systems. Aspects of the invention may be practiced in distributed computing environments where tasks or modules are performed by remote processing devices linked through a communications network. Various program modules, data stores, repositories, models, federators, objects, and their equivalents may be located in both local and remote memory storage devices.

By way of example, a conventional personal computer, referred to herein as a computer 100, includes a processing unit 102, a system memory 104, and a system bus 106 that couples various system components including the system memory to the processing unit. The computer 100 will at times be referred to in the singular herein, but this is not intended to limit the application of the invention to a single computer since, in typical embodiments, there will be more than one computer or other device involved. The processing unit 102 may be any logic processing unit, such as one or more central processing units (CPUs), digital signal processors (DSPs), application-specific integrated circuits (ASICs), etc.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the computer 100, such as during start-up.

The computer 100 also includes a hard disk drive 114 for reading from and writing to a hard disk 116, and an optical disk drive 118 and a magnetic disk drive 120 for reading from and writing to removable optical disks 122 and magnetic disks 124, respectively. The optical disk 122 can be a CD-ROM, while the magnetic disk 124 can be a magnetic floppy disk or diskette. The hard disk drive 114, optical disk drive 118, and magnetic disk drive 120 communicate with the processing unit 102 via the bus 106. The hard disk drive 114, optical disk drive 118, and magnetic disk drive 120 may include interfaces or controllers (not shown) coupled between such drives and the bus 106, as is known by those skilled in the relevant art. The drives 114, 118, 120, and their associated computer-readable media, provide nonvolatile storage of computer readable instructions, data structures, program modules, and other data for the computer 100. Although the depicted computer 100 employs hard disk 116, optical disk 122, and magnetic disk 124, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 126, one or more application programs 128, other programs or modules 130 and program data 132. The application programs 128, program or modules 130, and program data 132 may include information, instructions and parameters for creating, manipulating, scoring, ranking, uploading, and processing information to determine a best-fit match between students and tutors, to determine a certification of a tutor, provide filtering by a course code, etc. The system memory 104 may also include a browser 134 for permitting the computer 100 to access and exchange data with sources such as Web sites of the Internet, corporate intranets, or other networks as described above, as well as other server applications on server computers such as those further discussed above. In one embodiment, the browser 134 may be used to access course materials, view a tutor profile, and share information (e.g., questions or comments) with a tutor or otherwise build-up databases of information that may be customized for a variety of purposes in a learning environment. The browser 134 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the computer 100 as a personal computer, in other embodiments, the computer is some other computer-related device such as a tablet, a television, a personal data assistant (PDA), a mobile telephone (or other mobile device).

The operating system 126 may be stored in the system memory 104, as shown, while application programs 128, other programs/modules 130, program data 132, and browser 134 can be stored on the hard disk 116 of the hard disk drive 114, the optical disk 122 of the optical disk drive 118, and/or the magnetic disk 124 of the magnetic disk drive 120. A user can enter commands and information into the computer 100 through input devices such as a keyboard 136 and a pointing device such as a mouse 138. Other input devices can include a microphone, joystick, game pad, scanner, etc. These and other input devices are connected to the processing unit 102 through an interface 140 such as a serial port interface that couples to the bus 106, although other interfaces such as a parallel port, a game port, a wireless interface, or a universal serial bus ("USB") can be used. Another interface device that may be coupled to the bus 106 is a docking station 141 configured to receive and electronically engage a digital pen or stylus for the purpose of data transmission, charging, etc. A monitor 142 or other display device is coupled to the bus 106 via a video interface 144, such as a video adapter. The computer 100 can include other output devices, such as speakers, printers, etc.

The computer 100 can operate in a networked environment using logical connections to one or more remote computers, such as a server computer 146. The server computer 146 can be another personal computer, a server, another type of computer, or a collection of more than one computer communicatively linked together and typically includes many or all the elements described above for the computer 100. The server computer 146 is logically connected to one or more of the computers 100 under any known method of permitting computers to communicate, such as through a local area network ("LAN") 148, or a wide area network ("WAN") or the Internet 150. Such networking environments are well known in wired and wireless enterprise-wide computer networks, intranets, extranets, and the Internet. Other embodiments include other types of communication networks, including telecommunications networks, cellular networks, paging networks, and other mobile networks. The server computer 146 may be configured to run server applications 147.

When used in a LAN networking environment, the computer 100 is connected to the LAN 148 through an adapter or network interface 152 (communicatively linked to the bus 106). When used in a WAN networking environment, the computer 100 often includes a modem 154 or other device, such as the network interface 152, for establishing communications over the WAN/Internet 150. The modem 154 may be communicatively linked between the interface 140 and the WAN/Internet 150. In a networked environment, program modules, application programs, or data, or portions thereof, can be stored in the server computer 146. In the depicted embodiment, the computer 100 is communicatively linked to the server computer 146 through the LAN 148 or the WAN/Internet 150 with TCP/IP middle layer network protocols; however, other similar network protocol layers are used in other embodiments. Those skilled in the relevant art will readily recognize that the network connections are only some examples of establishing communication links between computers, and other links may be used, including wireless links.

The server computer 146 is further communicatively linked to a legacy host data system 156 typically through the LAN 148 or the WAN/Internet 150 or other networking configuration such as a direct asynchronous connection (not shown). Other embodiments may support the server computer 146 and the legacy host data system 156 on one computer system by operating all server applications and legacy host data system on the one computer system. The legacy host data system 156 may take the form of a mainframe computer. The legacy host data system 156 is configured to run host applications 158, such as in system memory, and store host data 160 such as business related data.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of limiting token use, said method comprising:
   receiving authentication information of a user from a computing device and logging in said computing device to a server application;
   displaying to said user on said computing device a plurality of membership options for access to streaming video of said server application, said streaming video of said server application being available to any computing device logged in using said authentication information of said user;
   receiving from said user a selection of one of said options indicating tokens allowed over a time period and a price;
   crediting an account of said user in a computer database with a specific quantity of tokens corresponding to said selected option, wherein said specific quantity of tokens are not transferable and may only be used within said user account;
   delivering a streamed video from a server computer to said computing device of said user, wherein said streamed video is not downloaded to said computing device;
   deducting a number of tokens corresponding to said streamed video from said specific quantity of tokens in said user account;
   determining if a number of tokens in said user account is zero;
   blocking access to said streaming video on said server computer by said any computing device logged in using said authentication information of said user when it is determined that said number of tokens is zero; and
   at the expiration of said time period, resetting said account to contain only said specific quantity of tokens.

2. A method as recited in claim 1 further comprising:
   collecting said price from said user as payment for said time period; and
   collecting said price again from said user at the expiration of said time period before resetting said account.

3. A method as recited in claim 1 wherein said price covers a length of time longer than said time period.

4. A method of limiting token use, said method comprising:
   registering in a user account in a database of a computer a specific available number of tokens during a time period, wherein said specific available number of tokens are not transferable and may only be used within said user account;
   periodically, at the end of said time period, resetting a number of tokens in said user account to be equal to said specific available number;
   receiving authentication information of a user from a computing device and logging in said computing device to a server application, said server application providing access to streaming video which is available to any computing device logged in using said authentication information of said user;
   receiving, at said server application, a selection from said computing device indicating a streamed video;
   deducting tokens from said account in exchange for said streamed video delivered from a server computer to said computing device of said user;
   determining if a number of tokens in said user account is zero;
   blocking access to said streaming video on said server computer by said any computing device logged in using said authentication information of said user when it is determined that said number of tokens is zero; and
   delivering said streamed video from said server computer to said computing device of said user when it is determined that said number of tokens is not zero, wherein said streamed video is not downloaded to said computing device.

5. A method as recited in claim 4 further comprising:
   collecting a price from said user as payment for said time period; and
   collecting said price again from said user at the expiration of said time period before resetting said user account.

6. A method as recited in claim 5 wherein said price covers a length of time longer than said time period.

* * * * *